(12) United States Patent
Allan et al.

(10) Patent No.: US 12,263,859 B2
(45) Date of Patent: Apr. 1, 2025

(54) SYSTEMS AND METHODS FOR DETECTING AND WARNING USERS OF OBJECTS IN VEHICLE PATHS

(71) Applicant: GM GLOBAL TECHNOLOGY OPERATIONS LLC, Detroit, MI (US)

(72) Inventors: Alexander Milne Allan, Howell, MI (US); Brian K. Saylor, South Lyon, MI (US); Adam Douglas Stanton, Novi, MI (US); Matthew Watts, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 18/302,068

(22) Filed: Apr. 18, 2023

(65) Prior Publication Data
US 2024/0351600 A1  Oct. 24, 2024

(51) Int. Cl.
| | |
|---|---|
| *B60W 30/09* | (2012.01) |
| *B60W 10/22* | (2006.01) |
| *B60W 40/02* | (2006.01) |
| *B60W 50/14* | (2020.01) |

(52) U.S. Cl.
CPC ............ *B60W 50/14* (2013.01); *B60W 10/22* (2013.01); *B60W 40/02* (2013.01); *B60W 2050/143* (2013.01); *B60W 2050/146* (2013.01)

(58) Field of Classification Search
CPC ....... B60W 50/14; B60W 10/22; B60W 40/02
See application file for complete search history.

(56) References Cited

U.S. PATENT DOCUMENTS

| | | | | |
|---|---|---|---|---|
| 5,587,938 | A * | 12/1996 | Hoetzel ................ | G01S 15/878 703/2 |
| 8,702,152 | B1 * | 4/2014 | Platto ..................... | B62D 37/02 296/180.1 |
| 9,766,336 | B2 * | 9/2017 | Gupta ..................... | G01S 17/06 |
| 10,229,596 | B1 * | 3/2019 | Weinberg ............... | G06V 20/58 |
| 2016/0339959 | A1 * | 11/2016 | Lee ........................ | G06V 20/588 |
| 2018/0118204 | A1 * | 5/2018 | Ito .......................... | G01S 13/931 |
| 2018/0281797 | A1 * | 10/2018 | Berels ................... | B60K 17/344 |
| 2020/0232870 | A1 * | 7/2020 | Dudar ................... | G01M 3/025 |
| 2021/0192234 | A1 * | 6/2021 | Chen ................... | B60W 60/001 |
| 2022/0242190 | A1 * | 8/2022 | Stanford ............... | B60K 35/10 |
| 2024/0010191 | A1 * | 1/2024 | White ................... | B60W 30/09 |

* cited by examiner

*Primary Examiner* — Hongmin Fan

(57) ABSTRACT

A system for detecting and warning a user of an object in a path of a vehicle includes a detection module configured to detect an object in a path of a vehicle, and a control module in communication with the detection module. The control module is configured to receive vehicle data from one or more vehicle sensors, determine a height of the detected object, determine a ground clearance of the vehicle based on the received vehicle data, and in response to the height of the detected object being greater than a threshold based on the ground clearance of the vehicle, generate a signal to notify the user of the detected object. Other examples systems and methods for detecting and warning a user of an object in a path of a vehicle are also disclosed.

20 Claims, 5 Drawing Sheets

SYSTEMS AND METHODS FOR DETECTING AND WARNING USERS OF OBJECTS IN VEHICLE PATHS

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for detecting and warning users of objects in vehicle paths.

Vehicles often include driver assistance systems that rely on sensors for blind spot detection, adaptive cruise control, lane departure warnings, etc. Such sensors include ultrasonic sensors, cameras, radars, and lidar sensors. Additionally, vehicles may include various other sensors for collecting vehicle data, such as speed, steering angle, acceleration/deceleration, etc.

SUMMARY

A system is disclosed for detecting and warning a user of an object in a path of a vehicle. The system includes a detection module configured to detect an object in a path of a vehicle, and a control module in communication with the detection module. The control module is configured to receive vehicle data from one or more vehicle sensors, determine a height of the detected object, determine a ground clearance of the vehicle based on the received vehicle data, and in response to the height of the detected object being greater than a threshold based on the ground clearance of the vehicle, generate a signal to notify the user of the detected object.

In other features, the control module is configured to display, on a display module, a graphic representing the detected object relative to the vehicle as the vehicle is moving based on the received vehicle data.

In other features, the signal to notify the user of the detected object is a warning signal, and the control module is configured to display a warning on the display module to notify the user of the detected object in response to the warning signal.

In other features, the signal to notify the user of the detected object is an impact signal, and the control module is configured to display a warning on the display module to notify the user of vehicle impact with the detected object in response to the impact signal.

In other features, the control module is configured to activate an audible warning to notify the user of vehicle impact with the detected object in response to the impact signal.

In other features, the control module is configured to display a notification on a display module to adjust a suspension height of the vehicle in response to the generated signal.

In other features, the control module is configured to automatically adjust a suspension height of the vehicle in response to the generated signal.

In other features, the threshold is a first threshold and the signal to notify the user of the detected object is a warning signal, and the control module is configured to, in response to the height of the detected object being greater than a second threshold based on the ground clearance of the vehicle, generate an impact signal to notify the user of vehicle impact with the detected object.

In other features, the detection module includes at least one of a radar sensor, a lidar sensor, an ultrasonic sensor, and a camera.

In other features, the one or more vehicle sensors includes at least one of an accelerometer sensor, a steering wheel angle sensor, a wheel sensor, and vehicle height sensor.

A method is disclosed for detecting and warning a user of an object in a path of a vehicle. The method includes detecting an object in a path of a vehicle, receiving vehicle data from one or more vehicle sensors, determining a height of the detected object, determining a ground clearance of the vehicle based on the received vehicle data, and in response to the height of the detected object being greater than a threshold based on the ground clearance of the vehicle, generating a signal to notify the user of the detected object.

In other features, the method includes displaying, on a display module, a graphic representing the detected object relative to the vehicle as the vehicle is moving based on the received vehicle data.

In other features, the signal to notify the user of the detected object is a warning signal, and the method further includes displaying a warning on the display module to notify the user of the detected object in response to the warning signal.

In other features, the signal to notify the user of the detected object is an impact signal, and the method further comprises displaying a warning on the display module to notify the user of vehicle impact with the detected object in response to the impact signal.

In other features, the method includes activating an audible warning to notify the user of vehicle impact with the detected object in response to the impact signal.

In other features, the method includes displaying a notification on a display module to adjust a suspension height of the vehicle in response to the generated signal.

In other features, the method includes automatically adjusting a suspension height of the vehicle in response to the generated signal.

In other features, the threshold is a first threshold and the signal to notify the user of the detected object is a warning signal, and the method further includes generating an impact signal to notify the user of vehicle impact with the detected object in response to the height of the detected object being greater than a second threshold based on the ground clearance of the vehicle.

In other features, the one or more vehicle sensors includes at least one of an accelerometer sensor, a steering wheel angle sensor, a wheel sensor, and vehicle height sensor.

In other features, the detection module includes at least one of a radar sensor, a lidar sensor, an ultrasonic sensor, and a camera.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A moving vehicle often encounters impending objects. Damage to the vehicle's undercarriage may occur if the vehicle contacts the impending objects. While a driver may be generally aware of the impending objects, the driver may not appreciate the size (e.g., the height) of the impending objects relative to the vehicle's ground clearance as the vehicle is moving. In other scenarios, drivers may be entirely unaware of the impending objects. In either case, the vehicle may hit the impending objects and cause damage to the vehicle's undercarriage.

The systems and methods according to the present disclosure provide accurate detection and tracking of objects in the path of a moving vehicle, and then provide warnings of the detected objects to the driver. For example, the systems and methods herein may detect an object in a path of a vehicle, determine a height of the detected object, determine a ground clearance of the vehicle based on received vehicle data, and then generate a signal to notify a driver of the detected object in response to the height of the detected object being greater than a threshold based on the ground clearance. In this manner, the detected objects may be avoided by, for example, the driver altering the course of the vehicle, the driver adjusting vehicle parameters (e.g., a suspension height of the vehicle, etc.), a vehicle control module automatically adjusting vehicle parameters, etc. As such, the driver may safely maneuver/traverse a path (e.g., on a road, while off-roading, etc.) without hitting impending objects which may cause damage to the vehicle.

Figure 1:
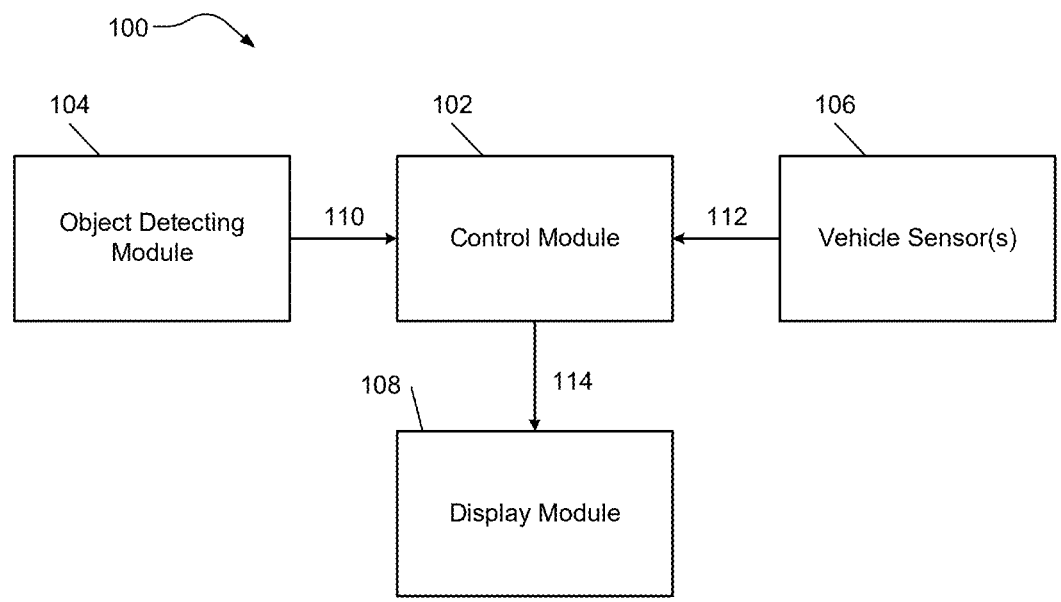
FIG. 1 is a block diagram of an example system for detecting and warning a driver of an object in a path of a vehicle according to the present disclosure.

Referring now to FIG. 1, a block diagram of an example system 100 is presented for detecting and warning a driver (e.g., a user) of an object in a path of a vehicle. The system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the system 100 may be applicable to an autonomous vehicle, a semi-autonomous vehicle, or a non-autonomous vehicle. Further, the vehicle may include, for example, a car, an SUV, a truck, etc.

As shown in FIG. 1, the system 100 generally includes a control module 102, an object detection module 104 in communication with the control module 102, and one or more vehicle sensors 106 in communication with the control module 102. For example, and as further explained below, the control module 102 may receive from the detection module 104 data associated with a detected object in the path of the vehicle via one or more input signals 110, and receive vehicle data from the vehicle sensors 106 via one or more input signals 112. In the example of FIG. 1, the system 100 may further include an optional display module 108 in communication with the control module 102. In such examples, the display module 108 may display a graphic (e.g., a virtual representation) of the detected object relative to the vehicle as the vehicle is moving, warnings to notify the driver of the detected object, notifications to adjust vehicle parameters (e.g., a suspension height of the vehicle), etc. as further explained below.

The detection module 104 detects and tracks an object in a path of the moving vehicle. For example, the object detection module 104 may include one or more detection devices mounted on a vehicle. During operation, a detection device of the object detection module 104 may emit waves (e.g., light waves, ultrasonic sound waves, microwave signals, etc.) and then receive reflected waves to detect objects. In some examples, the object detection module 104 may initially detect an object up to ten to twenty meters away from the vehicle depending on, for example, the speed of the vehicle. In various embodiments, the object detection module 104 may include, for example, one or more radar sensors, lidar sensors, ultrasonic sensors, cameras, and/or any other suitable detection devices mounted on the vehicle.

Figure 2:
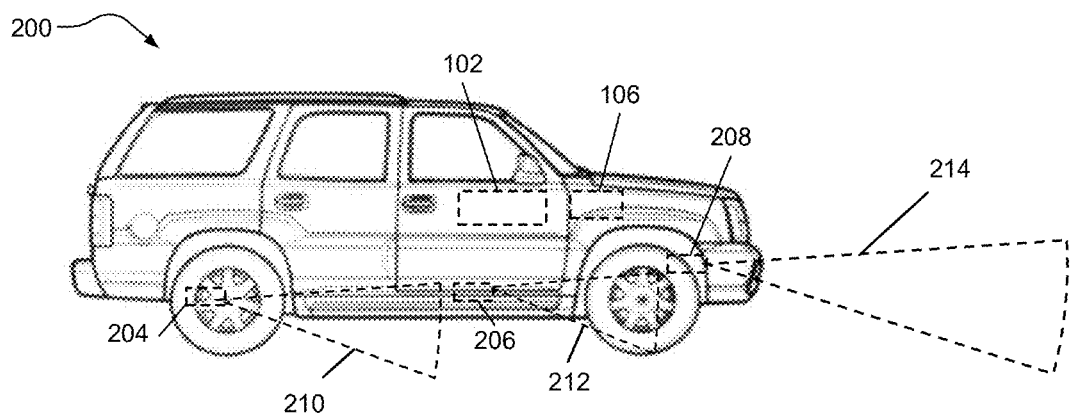
FIG. 2 is a diagram of a vehicle including a control module, vehicle sensors, and object detection devices according to the present disclosure.

For example, FIG. 2 depicts a vehicle (e.g., a SUV) 200 including the control module 102 and the one or more vehicle sensors 106 of FIG. 1, and multiple detection devices 204, 206, 208 mounted on the undercarriage (or underbody) of the vehicle 200. The devices 204, 206, 208 of FIG. 2 may be components of the object detection module 104 of FIG. 1. In the example of FIG. 2, the detection devices 204, 206 may be cameras having fields of view 210, 212, respectively, and the detection device 208 may be a lidar sensor, a radar sensor, or an ultrasonic sensor having a field of view 214. Although FIG. 2 illustrates the devices 204, 206, 208 having fields of views 210, 212, 214 pointing towards and away from the front of the vehicle 200, it should be appreciated that the detection devices 204, 206, 208 (or other detection devices mounted on the vehicle 200) may have fields of views pointing towards and away from the rear of the vehicle 200.

Figure 3:
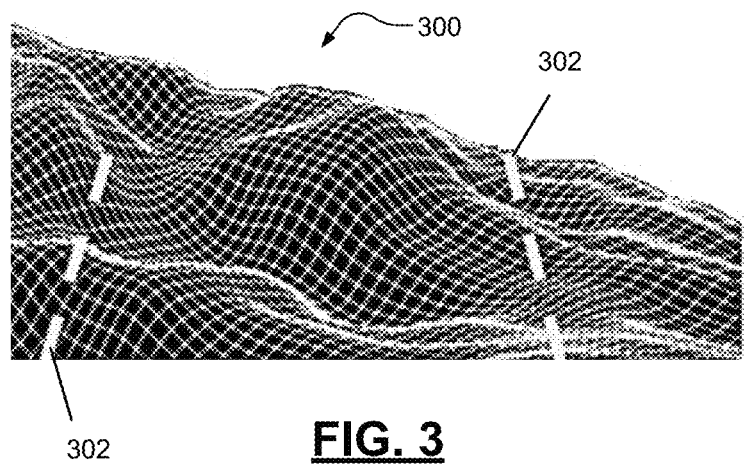
FIG. 3 is a lidar view showing terrain in a path of a vehicle according to the present disclosure.
Figure 4:
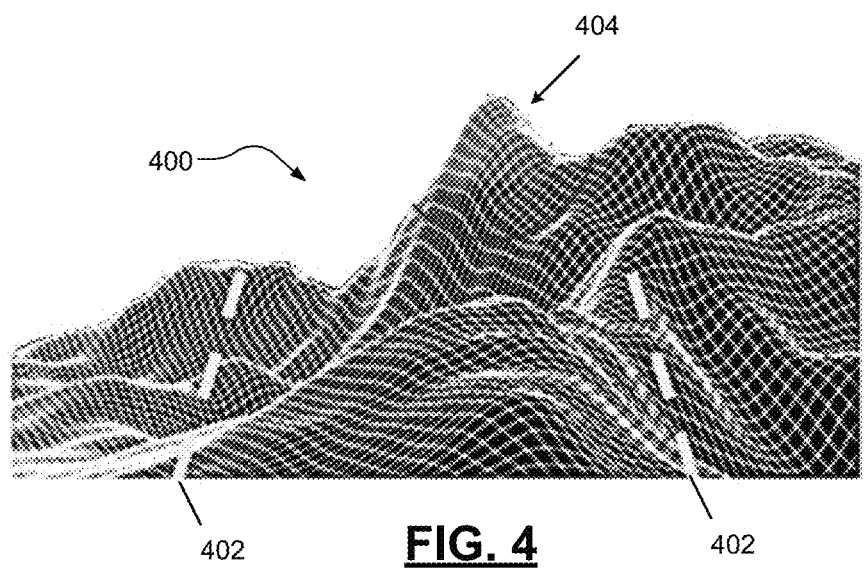
FIG. 4 is a lidar view showing terrain in a path of a vehicle and a detected object according to the present disclosure.

Referring back to FIG. 1, the object detected by the detection module 104 may be, for example, any object on the ground (e.g., a rock, etc.), a part of the ground (e.g., elevated terrain, etc.), etc. For example, FIGS. 3-4 depict detection device views of terrains 300, 400 in paths 302, 402 of a vehicle (e.g., the vehicle 200 of FIG. 2). In the example of FIGS. 3-4, the views may be lidar views provided by, for example, the detection device 208 of FIG. 2. The vehicle paths 302, 402 may represent the path of the vehicle's wheels, outer sides of the vehicle, etc. In the example of FIG. 3, no object is detected by the detection module 104, whereas in FIG. 4, an object 404 (e.g., an elevated terrain of the ground) is detected.

The control module 102 of FIG. 1 receives data associated with the detected object from the detection module 104 (e.g., the detection devices 204, 206, 208 of FIG. 2) via the input signals 110. Based on this received data, the control module 102 may determine, for example, a distance of the detected object relative to the vehicle and a height (e.g., an estimated height) of the detected object. For example, the control module 102 may determine the relative distance of the detected object based on the period of time between when a detection device emits waves and receives reflected waves. Further, the control module 102 may determine an estimated height of the detected object based on location data (e.g., X, Y, Z location data) associated with the reflected waves, the relative distance of the detected object, etc.

The vehicle sensors 106 of FIG. 1 may collect vehicle data and then transmit the collected vehicle data to the control module 102 via the signals 112. In various embodiments, the vehicle data may be continuously collected and transmitted. The vehicle sensors 106 may include any suitable sensing device. For example, the vehicle sensors 106 may include one or more accelerometer sensors, steering wheel angle sensors, wheel sensors, vehicle height sensors, etc. In such examples, the vehicle data may include, for example, vehicle speed, vehicle steering angle, acceleration and/or deceleration of the vehicle, forward and/or backward movement of the vehicle, distances between portions (e.g., centerlines) of the wheels and the frame of the vehicle, etc.

The control module 102 then determines a distance (e.g., an estimated distance) between the moving vehicle and the ground below the vehicle. This distance is often referred to as the vehicle's ground clearance. In such examples, the control module 102 may determine (e.g., continuously) the ground clearance of the moving vehicle relative to the undercarriage of the vehicle (e.g., the vehicle 200 of FIG. 2) based on, for example, the vehicle data, data associated with the terrain received from the detection module 104, etc. For example, the control module 102 may determine the ground clearance based at least on the distances between portions of the wheels and the frame of the vehicle.

In various embodiments, the determined ground clearance may be an assumed uniform distance for the entire undercarriage of the vehicle. In such examples, the uniform distance may represent the smallest ground clearance of multiple determined ground clearance associated with the undercarriage of the vehicle. In other examples, the ground clearance may be determined for different zones (e.g., areas) across the undercarriage of the vehicle.

The control module 102 may then determine whether the height of the detected object is such that the object is close to impacting the vehicle and/or will impact vehicle. For example, the control module 102 may determine one or more defined thresholds based on the ground clearance of the vehicle. For instance, one of the defined thresholds may be a warning threshold representing a distance (e.g., a height) less than the ground clearance of the vehicle. In such examples, the distance may be a percentage of the ground clearance. For example, the distance may be about 3 inches, 2.5 inches, 2 inches, 1.5 inches, 1 inch, and/or another suitable value less than the determined ground clearance of the vehicle. Additionally, one of the defined thresholds may be an impact threshold representing the ground clearance of the vehicle.

In other examples, the control module 102 may use the ground clearance of the vehicle to determine one or more defined thresholds in another manner. For example, the control module 102 may determine a difference between the ground clearance and the height of the detected object, and then compare the determined difference to the defined thresholds (e.g., the warning threshold and the impact threshold). For instance, the warning threshold may be on a defined distance (e.g., about 3 inches, 2.5 inches, 2 inches, 1.5 inches, 1 inch, and/or another suitable value, 1 inch, etc.), and the impact threshold may be a value of zero.

The control module 102 may then generate a signal to notify the driver (e.g., the user) of the detected object in response to the height of the detected object being greater than (e.g., exceeding) one of the defined thresholds. For example, the control module 102 may generate a warning signal in response to the detected object's height or the comparison based on the detected object's height being greater than the warning threshold. The generated warning signal may notify the driver of the detected object that is close to impacting the vehicle. Additionally, the control module 102 may generate an impact signal in response to the detected object's height or the comparison based on the detected object's height being greater than the impact threshold. In such examples, the generated impact signal may notify the driver of the detected object that will impact the vehicle.

In various embodiments, the control module 102 displays various outputs for the driver. In such examples, the control module 102 may transmit one or more signals 114 to the display module 108 to instruct the display module 108 to display the outputs. For example, the control module 102 may instruct the display module 108 to display a graphic representing the detected object relative to the vehicle as the vehicle is moving based on the received vehicle data and/or the received data associated with the detected object. In such examples, the graphic may be a virtual representation of the detected object.

For instance, the control module 102 may convert the received data from the object detection module 104 into a virtual object (e.g., an augmented reality object) representing the detected object. The control module 102 may then display the virtual object on the display module 108 relative to the moving vehicle based on the received vehicle data. In such examples, the received data from the object detection module 104 and the received vehicle data (e.g., from the accelerometer sensor, the wheel sensor, etc.) may be used to track and triangulate the detected object relative to the moving vehicle, thereby allowing the display module 108 to continually display the virtual object relative to the moving vehicle. In such examples, the size and location of the displayed virtual object may be maintained relative to proper ground position.

Figure 5:
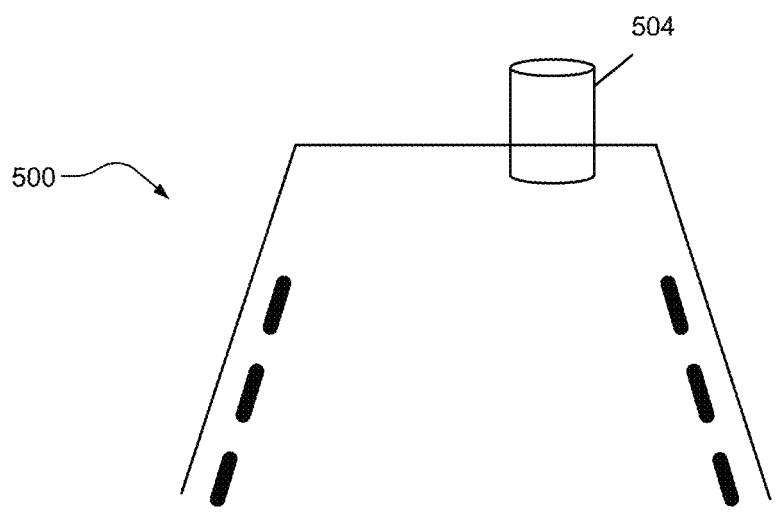
FIG. 5 is a display view showing a path of a vehicle and a virtual graphic representing a detected object according to the present disclosure.
Figure 6:
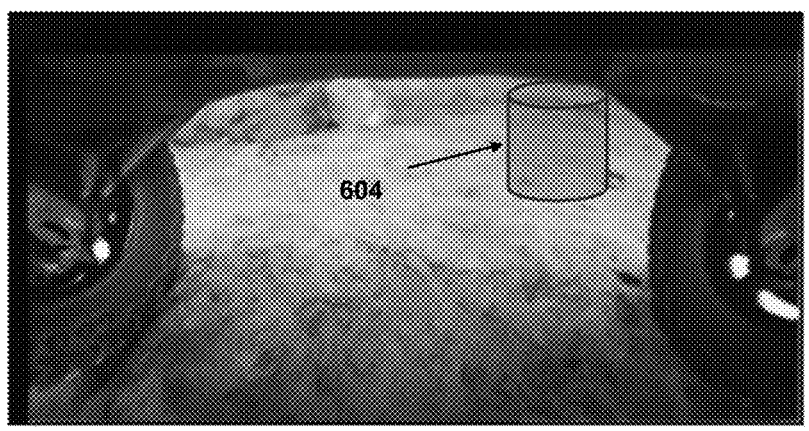
FIGS. 6-7 are display views from different cameras showing the underbody of a vehicle and a virtual graphic representing a detected object according to the present disclosure.
Figure 7:
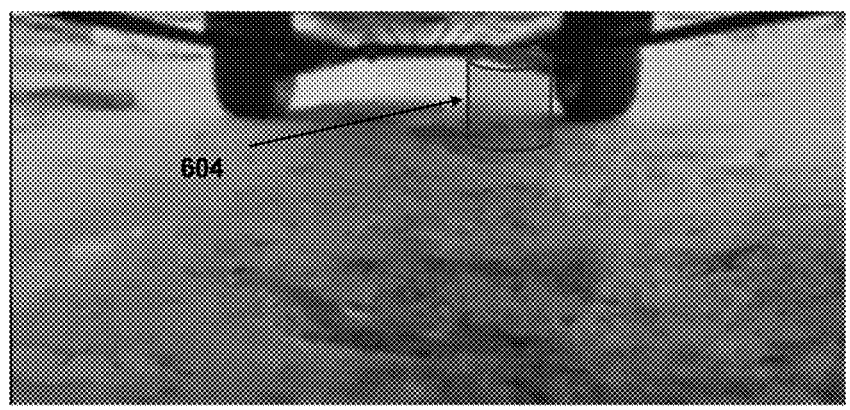

For example, FIGS. 5-7 depict example displays 500, 600, 700 including a graphic (e.g., a virtual object) representing a detected object. The displays 500, 600, 700 of FIGS. 5-7 may be presented by, for example, the display module 108 of FIG. 1. In FIG. 5, the display 500 includes a graphic 504 representing the detected object 404 (e.g., the elevated terrain) of FIG. 4. In FIGS. 6-7, the displays 600, 700 depict views from different cameras (e.g., the devices 204, 206 of FIG. 2) of a moving vehicle (e.g., the vehicle 200 of FIG. 2). As shown, the displays 600, 700 include a graphic 604 overlayed on the views from the cameras. For example, the view of the display 600 may be from the device 206 of FIG. 2 and depicts the graphic 604 as being in front of the moving vehicle. Additionally, the view of the display 700 may be from the device 204 of FIG. 2 and depicts the graphic 604 as being under the moving vehicle (e.g., near the front passenger side wheel).

With continued reference to FIG. 1, the control module 102 may also instruct the display module 108 to display a warning to notify the driver of the detected object in response to the generated warning signal and/or impact signal. For example, the display module 108 may display a possible impact warning in response to the warning signal, and/or display an impact warning in response to the impact signal. In response to the possible impact warning and/or the impact warning, the driver may elect to alter the path of the vehicle, slow down, etc.

Figure 8:
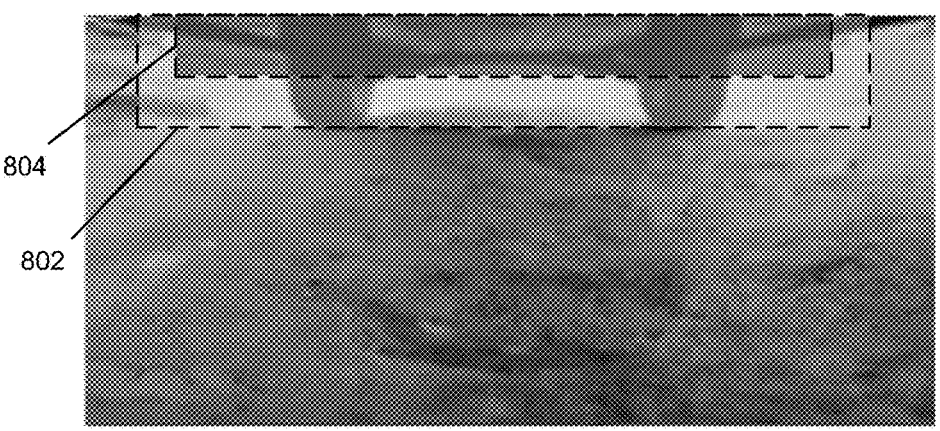
FIG. 8 is a display view from a camera showing the underbody of a vehicle and warnings according to the present disclosure.

Such warnings may be provided on the display module 108 as text (e.g., flashing text, etc.), graphics, etc. For example, FIG. 8 depicts an example display 800 of the undercarriage of a moving vehicle (e.g., the vehicle 200 of FIG. 2). As shown, the display 800 includes a box 802 representing a possible impact warning and a box 804 representing an impact warning. In various embodiments, the box 802 may be highlighted with one color (e.g., yellow, etc.), and the 804 may be highlighted with another color (e.g., orange, red, etc.).

In various embodiments, the control module 102 may activate an audible warning in response to the generated warning signal and/or impact signal. For example, the control module 102 may activate an audible beeping tone, a verbal notification and/or another suitable audible warning to notify the driver of vehicle impact with the detected object in response to the impact signal. In other examples, the control module 102 may activate another suitable audible warning (e.g., different than the audible warning for impact) to notify the driver of possible vehicle impact with the detected object. In either case, the audible warning may be output from speakers in the vehicle (e.g., speakers associated with the display module 108, etc.). In response to the audible warning, the driver may elect to alter the path of the vehicle, slow down, etc.

Additionally, in some embodiments, the vehicle may include options for adjusting a suspension height of the vehicle. In such examples, the suspension height of the vehicle may be adjusted based on user input (e.g., from the driver) and/or automatically adjusted without user input. In connection therewith, the control module 102 may instruct the display module 108 to display a notification to adjust a suspension height of the vehicle in response to the generated warning signal and/or impact signal. The driver (or another individual in the vehicle) may then select an input (e.g., in the vehicle, on the display module 108, etc.) to raise the suspension height of the vehicle in an attempt to avoid the detected object. In other examples, the control module 102 may automatically raise the suspension height of the vehicle in response to the generated warning signal and/or impact signal in an attempt to avoid the detected object.

Figure 9:
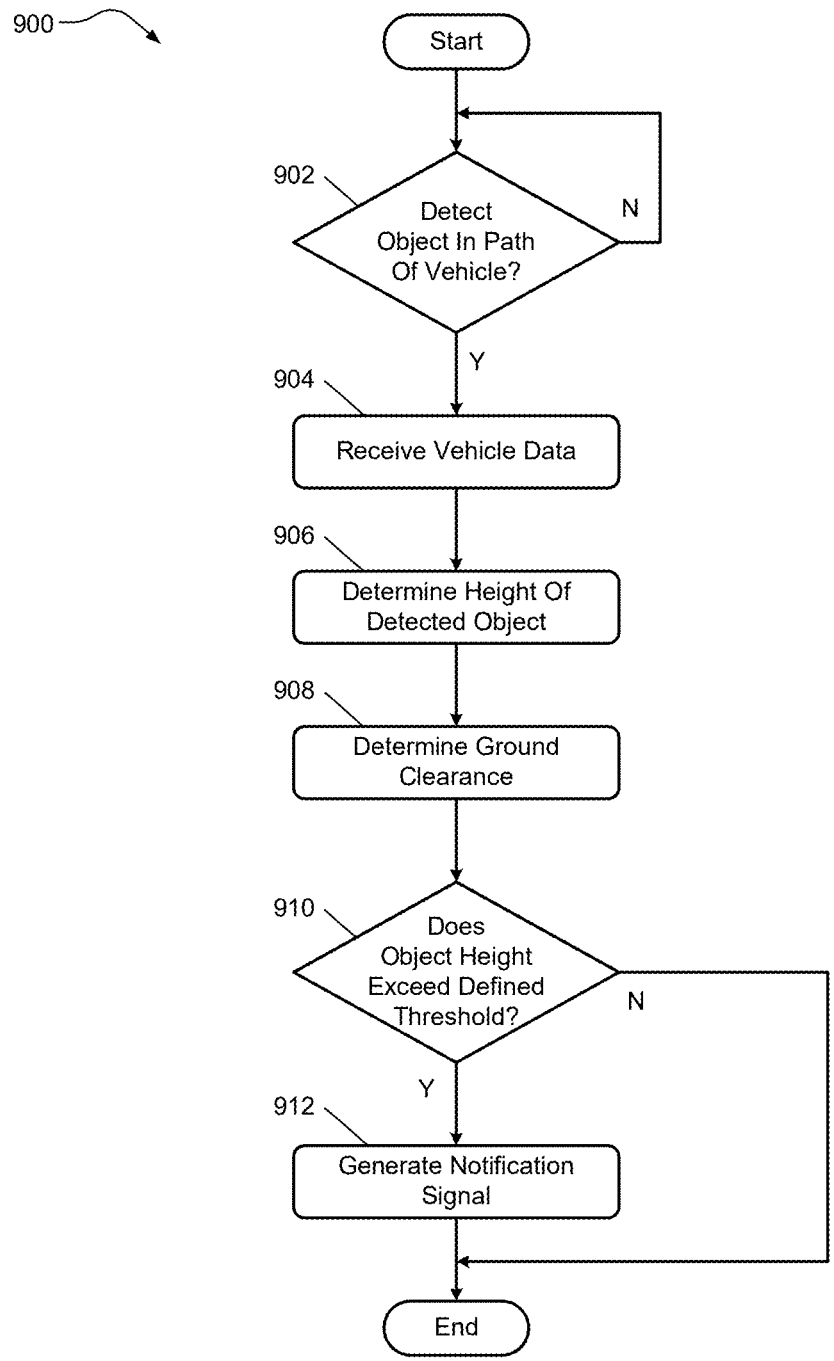
FIG. 9 is a flowchart of a control process for detecting and warning a driver of an object in a path of a vehicle according to the present disclosure.

FIG. 9 illustrates an example control process 900 employable by the system 100 of FIG. 1 for detecting and warning a driver of an object in a path of a vehicle (e.g., the vehicle 200 of FIG. 2). Although the example control process 900 is described in relation to the system of FIG. 1, including the control module 102, the object detection module 104, the vehicle sensors 106, and the display module 108, the control process 900 may be employable by any suitable system. The control process 900 may start when the system is powered-on and/or at another suitable time.

As shown in FIG. 9, control begins at 902 where the detection module 104 detects whether an object is in the path of the vehicle, as explained herein. If no, control returns to 902 or may end. If the detection module 104 detects an object is in the path of the vehicle, control proceeds to 904. At 904, the control module 102 receives vehicle data from the vehicle sensors 106. Such vehicle data may include, for example, vehicle speed, vehicle steering angle, acceleration and/or deceleration of the vehicle, forward and/or backward movement of the vehicle, distances between portions (e.g., centerlines) of the wheels and the frame of the vehicle, etc. as explained herein. Control then proceeds to 906, 908.

The control module 102 determines a height of the detected object at 906 and determines the ground clearance of the vehicle at 908. Such determinations may be made based on data associated with the detected object from the detection module 104 and the vehicle data from the vehicle sensors 106, as explained herein. Control then proceeds to 910.

At 910, the control module 102 determines whether the height of the detected object exceeds a defined threshold, such as a warning threshold or an impact threshold. For example, the defined threshold may be based on the ground clearance of the vehicle, such as a percentage of the ground clearance, a comparison associated with the ground clearance, etc. as explained above. In such examples, the control module 102 may compare the detected object's height directly to the defined threshold, compare the detected object's height relative to the ground clearance to the defined threshold, etc. If no at 910, control may end as shown in FIG. 9, or return to another desired step such as 902. If yes at 910, control proceeds to 912.

At 912, the control module 102 generates a signal to notify the driver of the detected object as explained herein. In such examples, the control module 102 may, for example, display (e.g., via the display module 108) a warning to alert the driver of the detected object, display the detected object (e.g., as a virtual graphic) overlayed on a camera view, activate an audible warning, etc. as explained herein.

Figure 10:
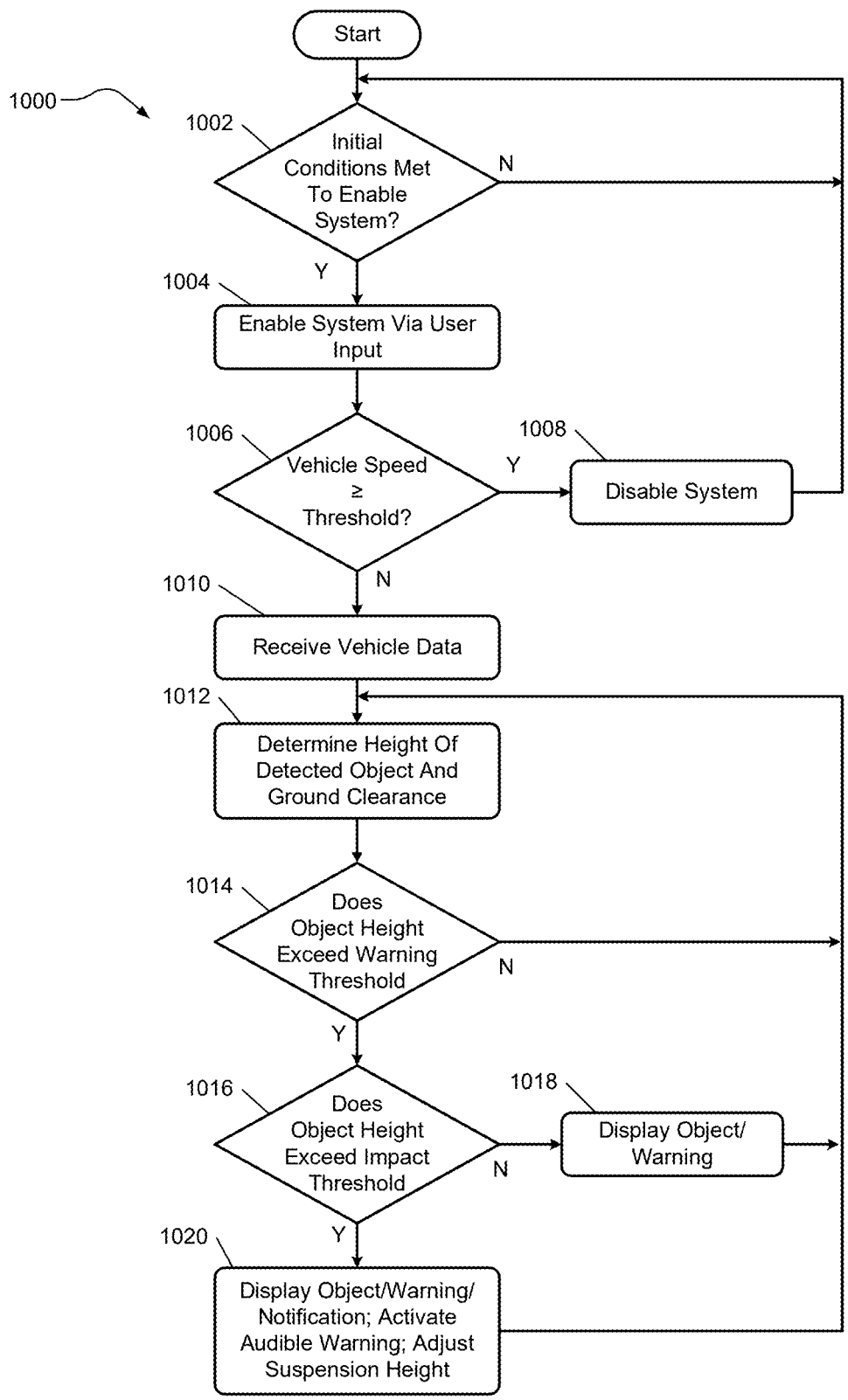
FIG. 10 is a flowchart of another control process for detecting and warning a driver of an object in a path of a vehicle according to the present disclosure.

FIG. 10 illustrates another example control process 1000 employable by the system 100 of FIG. 1 for detecting and warning a driver of an object in a path of a vehicle (e.g., the vehicle 200 of FIG. 2). Although the example control process 1000 is described in relation to the system of FIG. 1, including the control module 102, the object detection module 104, the vehicle sensors 106, and the display module 108, the control process 1000 may be employable by any suitable system. The control process 1000 may start when the system is powered-on and/or at another suitable time.

As shown in FIG. 10, control begins at 1002 where the control module 102 determines whether initial conditions are met to enable the system (e.g., a virtual spotter system) 100. For example, the control module 102 may determine whether desired vehicle components (e.g., one or more external cameras, one or more external sensors, etc.) and/or data (e.g., a vehicle height data) are useable (e.g., operational, valid, etc.). If the initial conditions are not met (e.g., the vehicle components and data are not operational, not valid, etc.), control returns to 1002. Additionally, in some examples, the control module 102 may grey out or otherwise disable a user input on the display module 108 for the virtual spotter system if the initial conditions are not met. If the initial conditions are met at 1002, control proceeds to 1004.

At 1004, the control module 102 enables the virtual spotter system. For example, the control module 102 may display a user input on the display module 108 for the virtual spotter system, and the driver (or another user in the vehicle) may select the input for the virtual spotter system. In response, the control module 102 enables the virtual spotter system. Control then proceeds to 1006.

At 1006, the control module 102 determines whether the speed of the moving vehicle less than a speed threshold. For example, the control module 102 may determine the speed of the moving vehicle based on data received from one or more of the vehicle sensors 106, receive the speed of the moving vehicle from one of the vehicle sensors 106, etc. Then, the control module 102 may compare the vehicle speed to the speed threshold (e.g., 25 miles per hour, 30 miles per hour, 35 miles per hour, etc.). If the vehicle speed is greater than or equal to the speed threshold, control proceeds to 1008 where the control module 102 disables the virtual spotter system. Control then returns to 1002.

If, however, the vehicle speed is less than the speed threshold, control proceeds to 1010, 1012. The control module 102 receives vehicle data from the vehicle sensors 106 at 1010 and determines a height of a detected object and the vehicle ground clearance at 1012, as explained above. Control then proceeds to 1014.

At 1014, the control module 102 determines whether the height of the detected object exceeds a defined warning threshold, as explained above. If no at 1014, control may return to 1012 as shown in FIG. 10 or to another desired step such as, for example, 1002, 1008, etc. In other examples, control may end. If yes at 1014, control proceeds to 1016.

At 1016, the control module 102 determines whether the height of the detected object exceeds a defined impact threshold, as explained above. If no at 1016, control proceeds to 1018. Otherwise, control proceeds to 1020.

At 1018, the control module 102 may display a camera view with the detected object (e.g., as a virtual graphic) and a possible impact warning to alert the driver, as explained herein. Control then returns to 1012 as shown in FIG. 10.

At 1020, the control module 102 may display a camera view with the detected object (e.g., as a virtual graphic) and an impact warning to alert the driver, as explained herein. In some embodiments, the control module 102 may also activate an audible warning at 1020. In still other embodiments, the control module 102 may display a notification to adjust a suspension height of the vehicle and/or automatically raise the suspension height of the vehicle at 1020. Control then returns to 1012 as shown in FIG. 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for detecting and warning a user of an object in a path of a vehicle, the system comprising:
    a detection module configured to detect an object in a path of a vehicle; and
    a control module in communication with the detection module, the control module configured to:
        receive vehicle data from one or more vehicle sensors;
        determine a height of the detected object;
        determine a plurality of ground clearance distances between an undercarriage of the vehicle at different zones of the undercarriage and the ground below the vehicle based on the received vehicle data;
        identify the smallest ground clearance distance of the plurality of ground clearance distances;
        in response to the height of the detected object being greater than a threshold based on the smallest ground clearance distance between the undercarriage of the vehicle and the ground below the vehicle, generate a signal to notify the user of the detected object; and
        display, on a display module, a graphic representing the detected object relative to the vehicle as the vehicle is moving over the detected object based on the received vehicle data.

2. The system of claim 1, wherein:
    the signal to notify the user of the detected object is a warning signal; and
    the control module is configured to display a warning on the display module to notify the user of the detected object in response to the warning signal.

3. The system of claim 1, wherein:
    the signal to notify the user of the detected object is an impact signal; and
    the control module is configured to display a warning on the display module to notify the user of vehicle impact with the detected object in response to the impact signal.

4. The system of claim 3, wherein the control module is configured to activate an audible warning to notify the user of vehicle impact with the detected object in response to the impact signal.

5. The system of claim 1, wherein the control module is configured to display a notification on a display module to adjust a suspension height of the vehicle in response to the generated signal.

6. The system of claim 1, wherein the control module is configured to automatically adjust a suspension height of the vehicle in response to the generated signal.

7. The system of claim 1, wherein:
    the threshold is a first threshold and the signal to notify the user of the detected object is a warning signal; and
    the control module is configured to, in response to the height of the detected object being greater than a second threshold based on the smallest ground clearance distance of the vehicle, generate an impact signal to notify the user of vehicle impact with the detected object.

8. The system of claim 1, wherein the detection module includes at least one of a radar sensor, a lidar sensor, an ultrasonic sensor, and a camera.

9. The system of claim 1, wherein the one or more vehicle sensors includes at least one of an accelerometer sensor, a steering wheel angle sensor, a wheel sensor, and vehicle height sensor.

10. A method for detecting and warning a user of an object in a path of a vehicle, the method comprising:
    detecting an object in a path of a vehicle;
    receiving vehicle data from one or more vehicle sensors;
    determining a height of the detected object;
    determining a plurality of ground clearance distances between an undercarriage of the vehicle at different zones of the undercarriage and the ground below the vehicle based on the received vehicle data;
    identifying the smallest ground clearance distance of the plurality of ground clearance distances;
    in response to the height of the detected object being greater than a threshold based on the ground clearance of the vehicle, generating a signal to notify the user of the detected object; and
    displaying, on a display module, a graphic representing the detected object relative to the vehicle as the vehicle is moving over the detected object based on the received vehicle data.

11. The method of claim 10, wherein:
    the signal to notify the user of the detected object is a warning signal; and
    the method further comprises displaying a warning on the display module to notify the user of the detected object in response to the warning signal.

12. The method of claim 10, wherein:
    the signal to notify the user of the detected object is an impact signal; and the method further comprises displaying a warning on the display module to notify the user of vehicle impact with the detected object in response to the impact signal.

13. The method of claim 12, further comprising activating an audible warning to notify the user of vehicle impact with the detected object in response to the impact signal.

14. The method of claim 10, further comprising displaying a notification on a display module to adjust a suspension height of the vehicle in response to the generated signal.

15. The method of claim 10, further comprising automatically adjusting a suspension height of the vehicle in response to the generated signal.

16. The method of claim 10, wherein:
the threshold is a first threshold and the signal to notify the user of the detected object is a warning signal; and
the method further comprises generating an impact signal to notify the user of vehicle impact with the detected object in response to the height of the detected object being greater than a second threshold based on the smallest ground clearance distance of the vehicle.

17. The method of claim 10, wherein the one or more vehicle sensors includes at least one of an accelerometer sensor, a steering wheel angle sensor, a wheel sensor, and vehicle height sensor.

18. The method of claim 10, wherein detecting the object in the path of the vehicle includes detecting the object in the path of the vehicle with at least one of a radar sensor, a lidar sensor, an ultrasonic sensor, and a camera.

19. The method of claim 14, wherein:
the method further comprises receiving a user input; and
adjusting the suspension height of the vehicle in response to the user input.

20. The system of claim 5, wherein the control module is configured to:
receive a user input; and
adjust the suspension height of the vehicle in response to the user input.

* * * * *